No. 763,950. PATENTED JULY 5, 1904.
W. H. BECKETT.
NUT LOCK.
APPLICATION FILED NOV. 21, 1903.
NO MODEL.

Witnesses
Inventor
W. H. Beckett
By O'Meara & Brock
Attorneys

No. 763,950.

Patented July 5, 1904.

UNITED STATES PATENT OFFICE.

WILLIAM H. BECKETT, OF DETOUR, MICHIGAN.

NUT-LOCK.

SPECIFICATION forming part of Letters Patent No. 763,950, dated July 5, 1904.

Application filed November 21, 1903. Serial No. 132,152. (No model.)

*To all whom it may concern:*

Be it known that I, WILLIAM H. BECKETT, a citizen of the United States, residing at Detour, in the county of Chippewa and State of Michigan, have invented a new and useful Nut-Lock, of which the following is a specification.

This invention is an improved form of nut-lock, the object being to provide a simple and efficient means for securely locking a nut upon a bolt or threaded spindle; and with this object in view the invention consists in the novel features of construction hereinafter fully described, and pointed out in the claims.

Figure 1:
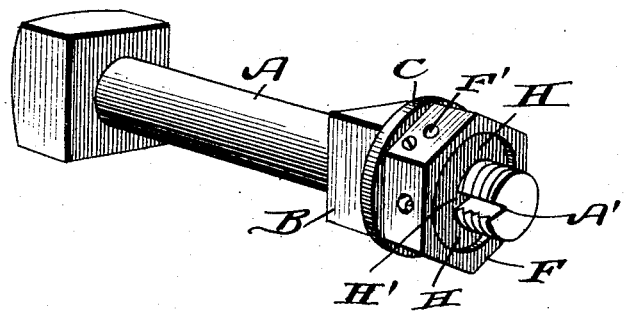
Figure 2:
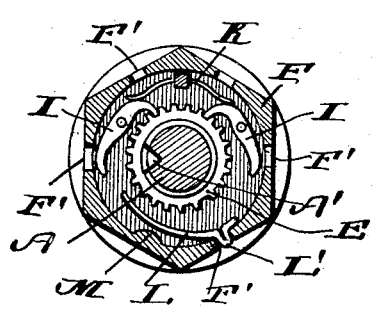
Figure 3:
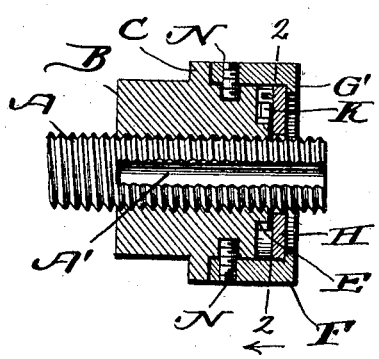
Figures 4, 5:
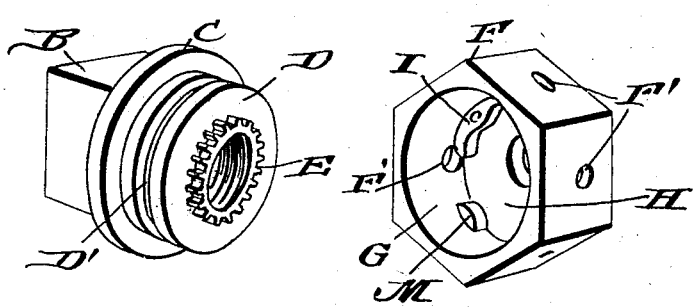

In the drawings forming part of this specification, Figure 1 is a perspective view showing my improved form of nut and lock applied to a bolt. Fig. 2 is a sectional view of the same on the line 2 2 of Fig. 3. Fig. 3 is a sectional elevation. Fig. 4 is a detail perspective view of the nut and washer. Fig. 5 is a detail perspective view of the cap which is adapted to fit upon the said nut and washer.

Referring to the drawings, A indicates a bolt or threaded spindle having a longitudinal groove A' produced in the threaded portion thereof. The nut B has a circular washer C formed integral with the outer face thereof, said circular washer having a circular boss D, which carries a toothed collar E upon its outer face, the sides of the circular boss being provided with an annular groove D', as most clearly shown in Figs. 3 and 4.

F indicates a cap which is hexagonal in shape and is constructed with a circular recess G, which extends entirely through the cap, annular shoulders G' being formed at the outer end of said cap, and a circular plate H fits into the circular recess of the cap and rests against the annular shoulder G', said circular plate having an inwardly-projecting lip H', which is adapted to engage the longitudinal groove A' produced in the threaded end of the bolt or spindle. This circular plate carries two pawls I upon the inner face thereof, said pawls being pivoted to the plate, and a spring K, connected also to the plate, bears at its free ends upon the said pawls for the purpose of holding them in engagement with the toothed collar E when the cap is placed upon the nut, said cap resting upon the washer C and completely annexing the circular boss D and the toothed collar E. This plate H also carries a spring L, the inner end of which is made fast to the plate, and adjacent the outer end is a shoulder L', which is adapted to engage one of a series of notches F' produced in the sides of the cap F. The purpose of this spring L is to lock the plate H within the cap. The circular recess G has a lug or shoulder M formed upon one side, the purpose of which is to engage the end of the pawl I and throw the said pawl out of engagement whenever it is desired to remove the nut. Set-screws N are employed for connecting the cap to the circular boss, said set-screws traveling in the annular groove D', thereby permitting the cap to be rotated upon the nut to prevent disconnection of said cap from the nut.

In operation the shoulder L' of the spring L is pushed inwardly, releasing the plate, and the nut can then be screwed upon the shaft, and after the nut has been screwed down to the proper degree of tightness the shoulder L' is permitted to engage one of the openings F', and the nut is then securely locked upon the bolt or spindle, as it is obvious that the plate being locked by virtue of engaging the bolt securely holds the cap, and the cap being locked against rotation also prevents the nut rotating. When it is desired to remove the nut, the shoulder L' is braced inwardly, disengaging the opening F', and the nut and cap can then be quickly and easily unscrewed from the bolt or spindle.

It is obvious that my invention can be employed wherever it is desired to securely fasten a nut upon the bolt, and I do not wish to confine myself to any particular use for the said nut-lock.

Having thus fully described my invention, what I claim as new, and desire to secure by Letters Patent, is—

1. A nut-lock comprising a nut having an integral washer and a toothed collar, and a cap fitting upon the nut and carrying a plate provided with a locking-lug, adapted to engage the grooved bolt, said plate also provided with means for engaging the toothed collar on said nut, as set forth.

2. A nut-lock comprising a nut having an integral washer, a circular boss and a toothed collar, and a cap fitting upon the nut and carrying a plate, said plate being adapted to engage a grooved bolt, and also provided with means for engaging the toothed collar carried by the nuts.

3. A nut-lock comprising a nut having an integral washer, circular bosses and toothed collar, and a perforated cap carrying a plate, said plate carrying spring-actuated pawls adapted to engage said toothed collar and a locking-spring adapted to engage said perforations, as set forth.

4. The combination with a grooved pawl, of a nut having an integral washer, circular boss and toothed collar, and a cap having a plate provided with a tongue adapted to engage a groove in the bolt, the pawls carried by the said plate, the spring bearing upon said pawls, the locking-spring carried by the plate and the shoulder arranged upon the interior of the cap and adapted to disengage the pawls, together with means for fastening the cap to the circular boss, as set forth.

WILLIAM H. BECKETT.

Witnesses:
   CHAS. McLEAN,
   T. H. WATSON.